(12) United States Patent
Leverrier

(10) Patent No.: US 8,997,568 B2
(45) Date of Patent: Apr. 7, 2015

(54) MICROMACHINED GYROSCOPE WITH DETECTION IN THE PLANE OF THE MACHINED WAFER

(75) Inventor: Bertrand Leverrier, Montelier (FR)

(73) Assignee: Thales, Neuilly sur Seine (FR)

( * ) Notice: Subject to any disclaimer, the term of this patent is extended or adjusted under 35 U.S.C. 154(b) by 467 days.

(21) Appl. No.: 13/381,358

(22) PCT Filed: May 28, 2010

(86) PCT No.: PCT/EP2010/057450
§ 371 (c)(1),
(2), (4) Date: May 31, 2012

(87) PCT Pub. No.: WO2011/000644
PCT Pub. Date: Jan. 6, 2011

(65) Prior Publication Data
US 2012/0272732 A1   Nov. 1, 2012

(30) Foreign Application Priority Data

Jun. 30, 2009 (FR) ...................................... 09 03189

(51) Int. Cl.
*G01C 19/5747* (2012.01)
*G01C 19/5719* (2012.01)
*G01C 19/56* (2012.01)

(52) U.S. Cl.
CPC .................................. *G01C 19/5747* (2013.01)

(58) Field of Classification Search
USPC ................ 73/504.12, 504.14, 504.16, 504.04
See application file for complete search history.

(56) References Cited

U.S. PATENT DOCUMENTS

| | | | | |
|---|---|---|---|---|
| 6,539,803 | B2 * | 4/2003 | Mochida | 73/504.12 |
| 6,742,390 | B2 * | 6/2004 | Mochida et al. | 73/504.14 |
| 6,845,666 | B2 * | 1/2005 | Mochida | 73/504.12 |
| 7,051,591 | B2 * | 5/2006 | Chaumet et al. | 73/504.12 |
| 7,159,460 | B2 * | 1/2007 | Nicu et al. | 73/504.12 |
| 7,210,347 | B2 * | 5/2007 | Nicu et al | 73/504.12 |
| 7,267,004 | B2 * | 9/2007 | Leverrier et al. | 73/504.12 |
| 7,284,429 | B2 * | 10/2007 | Chaumet et al. | 73/504.12 |

FOREIGN PATENT DOCUMENTS

| | | | |
|---|---|---|---|
| FR | 2834055 | A1 | 6/2003 |
| FR | 2846740 | A1 | 5/2004 |
| FR | 2859527 | A1 | 3/2005 |
| FR | 2859528 | A1 | 3/2005 |

\* cited by examiner

*Primary Examiner* — Helen Kwok
(74) *Attorney, Agent, or Firm* — Baker and Hostetler LLP

(57) ABSTRACT

A gyroscope having a vibrating structure, produced by micromachining in a thin planar wafer, the gyroscope including two symmetrical moving assemblies that are coupled by a coupling structure connecting the two assemblies so as to allow mechanical vibration energy to be transferred between them, each moving assembly including a first moving element connected to the coupling structure and able to vibrate with two degrees of freedom in orthogonal directions Ox and Oy of the plane of the wafer, and a second moving element adjacent the first moving element, capable of vibrating only in the Oy direction and connected to the first moving element via linkage element, wherein the linkage element allow the transmission, in phase opposition, to the second moving element of the vibration movement of the first moving element in the Oy direction.

21 Claims, 6 Drawing Sheets

MICROMACHINED GYROSCOPE WITH DETECTION IN THE PLANE OF THE MACHINED WAFER

CROSS-REFERENCE TO RELATED APPLICATIONS

This application is a National Stage of International patent application PCT/EP2010/057450, filed on May 28, 2010, which claims priority to foreign French patent application No. FR 09 03189, filed on Jun. 30, 2009, the disclosures of each of which are incorporated by reference in their entireties.

FIELD OF THE DISCLOSED SUBJECT MATTER

The invention relates to inertial sensors for measuring angular velocities, or gyroscopes, and more precisely gyroscopes micromachined using the technologies of etching, deposition, doping, etc. similar to those used in the field of electronic integrated circuits. Such micromachined inertial sensors produced on a silicon or quartz wafer are already known. The structure is a planar structure in the plane of the silicon or quartz wafer in which it is etched.

BACKGROUND

Structures having two vibrating masses mechanically coupled in the manner of a tuning fork have already been produced: the structure of a gyroscope thus produced typically comprises two coplanar moving assemblies excited so as to vibrate and connected in the manner of a tuning fork, that is to say the two assemblies are connected to a central coupling structure that transfers the vibration energy of the first assembly to the second assembly, and vice versa. The assemblies are excited into vibration in the plane of the wafer by an electrical excitation structure. This vibration in the plane of the wafer is exerted perpendicularly to an axis, called the sensitive axis, of the gyroscope, perpendicular to the direction of this vibration. When the gyroscope rotates at a certain angular velocity about its sensitive axis, the composition of the forced vibration with the angular rotation vector generates, by the Coriolis effect, forces that set the moving assemblies into natural vibration perpendicular to the excitation vibration and to the rotation axis. The amplitude of this natural vibration is proportional to the rotation rate. The natural vibration is detected by an electrical detection structure. The resulting electrical signals are used to deduce therefrom the angular velocity about the sensitive axis.

Patent applications FR 2 846 740 and FR 2 859 527 disclose gyroscopes in which the sensitive axis is the Oz axis perpendicular to the plane of the moving masses. The excitation movement of the moving assemblies is generated along a direction Ox of the plane whereas movement resulting from the Coriolis force is detected in a direction Oy of the same plane, perpendicular to Ox.

Patent application FR 2 846 740 discloses a gyroscope of the type having a tuning-fork architecture. Each moving assembly of this gyroscope comprises an inertial first moving element connected to the coupling structure and able to vibrate with two degrees of freedom in orthogonal directions Ox and Oy of the plane of the wafer, and a second moving element connected on one side to the first moving element and on the other side to fixed anchoring zones via linkage means that allow the vibration movement of the first element along the Oy direction to be transmitted to the second element without allowing the second element to move along the Ox direction.

The tuning fork architecture has a drawback, namely detection mode in which the moving elements of a moving assembly vibrate along the Oy direction is not dynamically balanced. This is because the two moving elements vibrate in phase opposition in the Oy direction. Consequently, this mode transmits a torque to the support of the tuning fork, making this mode sensitive to the conditions of attachment to the support and sensitive to the external perturbations transmitted by the support.

To remedy this problem, a double tuning-fork solution disclosed in patent application FR 2 859 527 is known. Each moving assembly of this gyroscope comprises three moving elements, an inertial first moving element connected to the coupling structure and intended to vibrate along two orthogonal directions Ox and Oy in the plane of the wafer, a second moving element intended to vibrate along Oy and connected to the first moving element and to fixed anchoring zones via linkage means that allow the vibration movement of the first moving element along Oy to be transmitted to the second moving element without allowing the second element to move along the Ox direction, and a third moving element intended to vibrate along Oy and connected to the second moving element and to fixed anchoring zones via second linkage means that allow transmission, in phase opposition, of the vibration movement of the second moving element along Oy to third moving element.

What is thus obtained is a double tuning-fork gyroscope having a balanced detection movement within each of the moving assemblies because the movement of the third moving element counterbalances the movement of the first and second moving elements. A rotation rate is measured with very great sensitivity, as in the case of a single tuning fork, and with minimal perturbations due to the excitation movement.

However, the double tuning-fork gyroscope of the prior art has the drawback, owing to the addition of an additional moving element in each moving assembly, of being larger in size and therefore more costly and more complicated to produce than a single tuning fork.

This drawback is exacerbated by the fact that the addition of the third moving element adds parasitic vibration modes having, because of etching defects, frequencies that are much more difficult to bring under control than with a simple tuning fork.

SUMMARY

The object of the invention is to provide a gyroscope that can be dynamically balanced, unless in the simple tuning fork of the prior art, and which remedies the drawbacks associated with the double tuning-fork gyroscope of the prior art.

For this purpose, the subject of the invention is a gyroscope having a vibrating structure, produced by micromachining in a thin planar wafer, said gyroscope comprising two symmetrical moving assemblies that are coupled by a coupling structure connecting these two assemblies so as to allow mechanical vibration energy to be transferred between them, each moving assembly comprising two moving elements, a first moving element being connected to the coupling structure and able to vibrate with two degrees of freedom in orthogonal directions Ox and Oy of the plane of the wafer, and a second moving element, adjacent the first moving element, capable of vibrating only in the Oy direction and being connected to the first moving element via linkage means, said linkage means allowing the transmission, in phase opposition, to the second moving element of the vibration movement of the first moving element in the Oy direction.

The gyroscope according to the invention may furthermore have one or more of the following features taken together or separately:

- said second moving element being furthermore connected to fixed anchoring zones via linkage means, for linking the second moving element to the anchoring zones, preventing the second moving element from moving in the Ox direction;
- the first moving element is a frame connected to the coupling structure and surrounding the second moving element and in that the coupling structure comprises an external frame at least partially surrounding the first moving element;
- the linkage means comprise at least two linkage assemblies for linking the first moving element with the second moving element, the linkage assemblies comprising at least one linkage element comprising a first narrow elongate flexure beam or arm which has a high resistance to elongation in the Oy direction and a low stiffness in the Ox direction connected to a means for transmitting, in phase opposition, a movement of the first moving element in the Oy direction to the second moving element;
- the means for transmitting, in phase opposition, a movement in the Oy direction is a second narrow elongate flexure beam which has a high resistance to elongation in the Ox direction and a low stiffness in the Oy direction, the second beam being connected to the first beam so as to form an L-shaped linkage element;
- the first and second flexible beams of an L-shaped linkage element extend in their entirety in the direction in which they have a high resistance to elongation;
- at least the first or second flexible beam of an L-shaped linkage element is a beam bent over into a U comprising two branches connected by means of a short linkage element;
- the linkage assemblies comprise only one L-shaped linkage element connected on one side to the first moving element and on the other side to the second moving element;
- the linkage assemblies comprise two linkage elements connected together via a short linkage element and connected to the first moving element and to the second moving element respectively;
- the linkage assemblies forming double Ls comprise an outer L and an inner L, the length along the Ox axis and the length along the Oy axis of the outer L are greater than the length along the Ox axis and the length along the Oy axis respectively of the inner L, the first beam and the second beam forming the outer L being connected together via a rigid element, the length along the Ox axis of which and the length along the Oy axis of which are equal to the difference in length along the Ox axis and along the Oy axis between the outer L and the inner L respectively;
- the first and second beams forming each L of a linkage assembly are directly connected one to the other;
- each moving assembly comprises at least two narrow elongate flexure beams for linkage to the anchoring zones connecting the second moving element to at least one anchoring zone, the flexure beams for linkage to the anchoring zones having a high resistance to elongation in the Ox direction and a low stiffness in the Oy direction;
- $K_{42,44,46,48}$ being the stiffness coefficient of the second flexure beams; $K_{20}$ being the stiffness coefficient along the Oy axis of the outer frame and $M_{50}$ and $M_{30}$ being the respective masses of the first and second moving elements, the following condition is met or approximately met:

$$K_{42,44,46,48}/M_{30}=2K_{20}/M_{50};$$

- the linkage assemblies comprise a single linkage element connected on one side to the first moving element and on the other side to the second moving element, in which the means for transmitting, in phase opposition, a movement of the first moving element in the Oy direction to the second moving element is a lever connected on one side to the first beam and on the other side to one of the two moving elements, the first beam being further connected to the moving element adjacent that to which the lever is connected, the lever being linked with an anchoring zone so as to pivot about a pivot axis Op extending along the Oz direction lying between the first beam and the moving element to which the lever is connected;
- the first flexible beam extends in its entirety along the Oy direction;
- the first flexible beam is a beam bent into a U comprising two branches connected together via a short rigid element;
- the lever extends substantially along the Ox direction when the first moving element and the second moving element are in their respective rest positions around which they oscillate respectively;
- $L_{50}$ being the first distance between the axis of the pivot Op and the point of linkage of the lever to the first moving element along the axis of the lever, $L_{30}$ being the second distance between the axis of the pivot Op and the point of linkage of the lever to the second moving element along the axis of the lever and $M_{50}$ and $M_{30}$ being the respective masses of the first moving element and the second moving element, the following condition is met or approximately met:

$$L_{30}/L_{50}=M_{50}/M_{30}; \text{ and}$$

- $M_{30}$ is less than $M_{50}$ so as to increase the sensitivity of the gyroscope.

A gyroscope is obtained that has a balanced detection movement within each of the two moving assemblies because the movement of the second moving element counterbalances the movement of the first moving element.

The gyroscope according to the invention, owing to the presence of only two moving elements per moving assembly, is less expensive and less difficult to balance than a double tuning fork.

The advantage of the gyroscope according to the first embodiment is that a true double tuning fork is obtained. The coupling via a spring along Oy between the two moving elements makes it possible to ensure perfect dynamic balancing (the principle of a tuning fork) even in the presence of small etching defects. Although in the case of the second embodiment the vibration amplitude ratios are set only by the dimensions of the lever, any fabrication (etching, etc.) defects that may change the values of the moving masses or the lengths of the lever are then not compensated for.

However, in the second embodiment of the invention the small number of vibration modes also helps in designing the tuning fork, for frequency separation of the useful vibration modes from the unuseful vibration modes. Precise velocity measurements are thus obtained.

BRIEF DESCRIPTION OF THE DRAWINGS

Other features and advantages of the invention will become apparent on reading the following detailed description given by way of nonlimiting example and with reference to the appended drawings in which.

From one figure to the other, the same elements are identified by the same references.

DETAILED DESCRIPTION

Figure 1A:
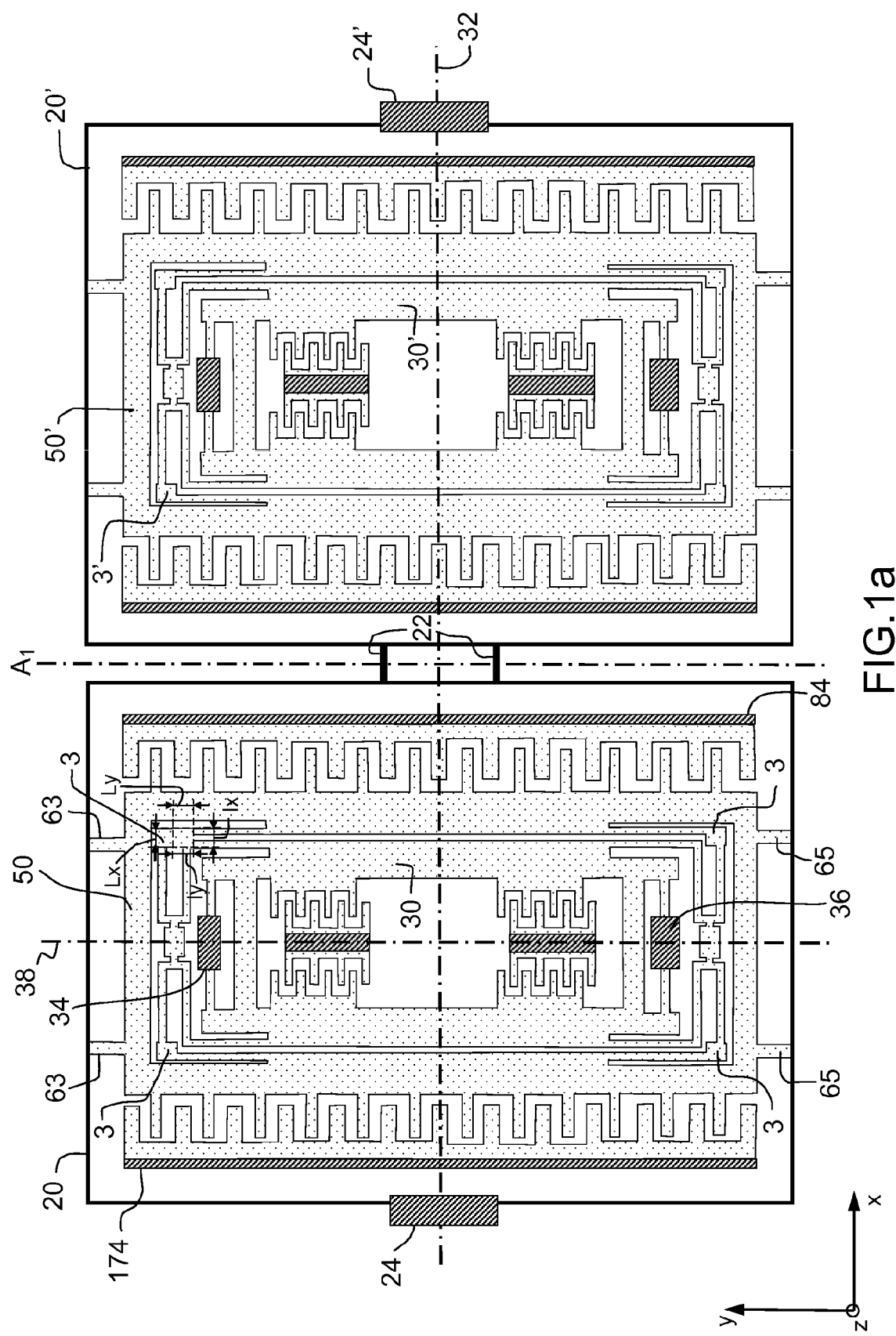
FIG. 1a shows schematically, in top view, the overall structure of the micromachined gyroscope according to a first embodiment of the invention

FIG. 1a shows the thin planar silicon wafer machined according to a first embodiment of the invention in order to make a gyroscope whose sensitive axis is perpendicular to the plane of the wafer (which is the plane of the figure).

Silicon is chosen as preferred material, firstly for its mechanical properties and secondly for its high conductivity when it is doped sufficiently with an appropriate impurity (in general boron in the case of p-type silicon). Conductive silicon allows the electrical functions of the gyroscope, and notably the excitation and detection functions, to be carried out. These functions are carried out by interdigitated capacitive combs supplied with electrical current or voltage. The teeth of these combs, machined directly in the conductive silicon, serve as the plates of capacitors useful for the excitation functions and the detection functions. The thickness of the starting silicon wafer is a few hundred microns, for example. The wafer has, on the one hand, fixed anchoring zones formed in this thickness and, on the other hand, the actual vibrating structure, which is free relative to the anchoring zones and is formed over a smaller thickness, for example over a thickness of around sixty microns, and is isolated from the rest of the thickness of the wafer by a narrow gap. The silicon wafer is cut by micromachining, over this thickness of around 60 microns, into the desired features, namely the moving mass, the moving frame, the coupling structure, the flexure arms or beams and the interdigitated combs.

The structure may be machined using, as starting substrate, a silicon-on-insulator substrate, but other methods are also possible. A silicon-on-insulator substrate consists of a silicon substrate a few hundred microns in thickness that carries, on its front face, a thin layer of silicon oxide which is itself covered with a layer of single-crystal silicon a few tens of microns in thickness. The machining operation consists in etching the silicon of the upper layer via its front face into the desired surface features, by means of photo-etching techniques in usage in microelectronics, down to the oxide layer using a selective etchant that etches the silicon without significantly etching the oxide. The etching is stopped when the oxide layer is bared. This oxide layer is then removed by selective etching using another etchant so as to leave only the surface layer of single-crystal silicon, except in the anchoring zones where the oxide there remains and forms a strong bond between the substrate and the surface layer of single-crystal silicon. Machining via the front face defines the various cutting operations for the moving parts. These are therefore the above surface features, anchoring zones and configurations for the moving parts, as will be seen in the figures. The overall structure of the gyroscope is a symmetrical structure comprising two moving inertial assemblies vibrating in phase opposition, these moving assemblies being connected together via a coupling structure serving to transmit, without any loss, from one assembly to the other, the mechanical vibration energies of the two assemblies so that these vibrations are placed in phase opposition. The symmetry of the structure is a symmetry with respect to an axis A1, with one moving assembly on each side of this axis. The coupling structure is preferably formed by two rectangular outer frames 20 and 20' within which the moving inertial assemblies, namely a first moving assembly and a second moving assembly respectively, are located. The frames 20 and 20' are connected together via a short double linkage bar 22, which may be considered to be rigid. The double linkage bar 22 connects one side of the first frame to the adjacent side of the second frame. It is perpendicular to the axis A1 and centered on this axis. The short double linkage bar 22 may be a simple bar or one reinforced by another short linkage bar located at the middle of the double bar 22 and also centered on the axis A1. The relatively large spacing of each of the bars constituting the double bar 22 allows the difference between the useful excitation and detection frequencies of the microgyroscope to be adjusted by a certain amount.

The outer frames 20 and 20' of the coupling structure surround the two moving assemblies, in principle over at least three sides, and they are connected to these two assemblies preferably along sides perpendicular to the general axis of symmetry A1. The frames 20 and 20' may (optionally) each be attached to an anchoring zone 24, 24' located in the middle of one side, opposite the side connected to the linkage bar 22. In this case, the frames 20 and 20' each completely surround a respective inertial moving assembly. The central linkage bar 22 and the other sides of the frames 20 and 20' are not connected to fixed anchoring zones.

The interdigitated combs serving to make the inertial assemblies vibrate and to detect the movement resulting from the Coriolis force are also themselves placed inside each of the outer frames 20 and 20'. In what follows, only the elements located inside the frame 20 will be described, the structure being strictly identical for the other frame 20'. The elements internal to the frame 20' (second moving assembly) are denoted by the same references as those of the frame 20, but with the addition of the "prime" suffix.

Figure 1B:
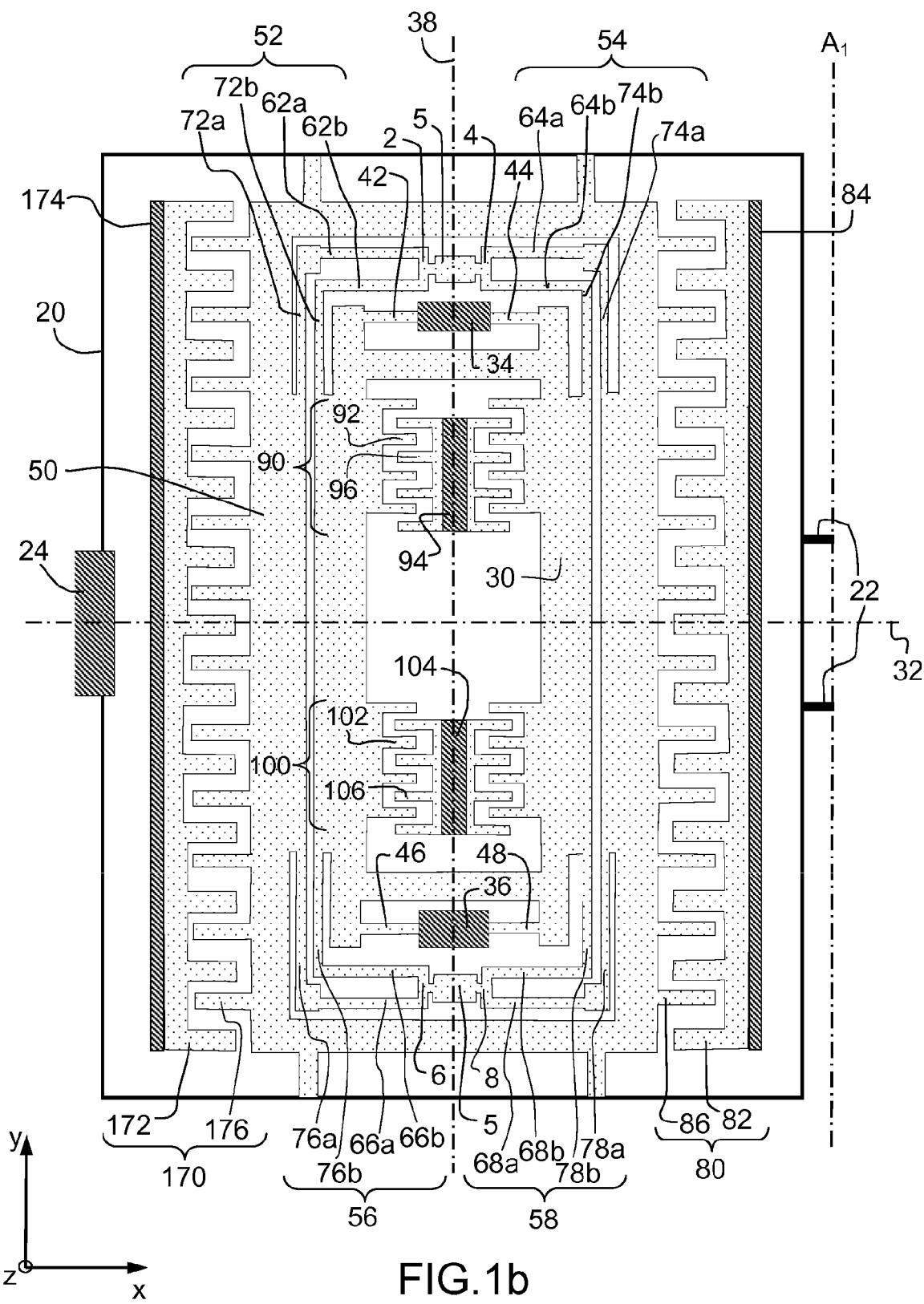
FIG. 1b shows an enlargement of the first moving assembly of the gyroscope according to the first embodiment.

For greater clarity, all the elements have not been referenced in FIG. 1a. FIG. 1b shows an enlargement of FIG. 1a in which the elements present inside the frame 20, namely the first moving assembly, have been shown. It will be noted henceforth that the same applies to FIG. 3a in which all the elements have not been referenced. FIG. 3b shows an enlargement of FIG. 3a in which the elements present inside the frame 20, namely the first moving assembly, have been shown.

Each inertial assembly comprises a first moving element called intermediate inertial frame 50 that surrounds a second moving element, denoted by detection mass 30. The intermediate inertial frame 50 is located between the second moving element 30 and the outer frame 20.

The detection mass 30 can move only in the Oy direction (vertical axis in the plane of the figure). The intermediate inertial frame 50 may move on the Oy axis and on an Ox axis perpendicular to the Oy axis and which is also located in the plane of the figure. Specifically, as will be seen later, the detection mass 30 is connected to fixed anchoring zones by means of linkage means for linking the mass to the anchoring zones that prevent the mass from moving in the Ox direction. The sensitive axis of the gyroscope is an axis Oz perpendicular to the plane of the wafer. A vibration of the intermediate inertial frame 50 in the Ox direction is excited. When the gyroscope rotates about its sensitive axis Oz, the intermediate inertial frame 50 is made to vibrate along the Oy axis. This vibration along Oy is transmitted to the internal frame 30 in phase opposition with that of the first moving element 50, whereas the vibration along Ox is not transmitted. The amplitude of vibration of the second moving element 30 is proportional to the vibration movement of the intermediate frame 50 in the Oy direction. The detection movement is thus balanced within each of the two moving assemblies because the movement of the detection mass 30 counterbalances the movement of the intermediate frame 50.

As will be seen later, a vibration excitation structure is associated with the intermediate frame 50 and a vibration detection structure is associated with the detection mass 30. The coupling structure, formed by the frames 20, 20' and the bar 22 that connects them, transmits the mechanical vibration energy of the moving inertial assembly from one side of the axis A1 to the other, both for vibrations along Ox and vibrations along Oy as this coupling structure is connected directly to the first moving elements which can vibrate both along Ox and along Oy.

The intermediate frame 50 surrounds, preferably completely, the mass 30. Preferably, it has a generally rectangular shape like the mass 30 and the outer frame 20. The external intermediate frame 50, surrounded by the outer frame 20 of the coupling structure, is connected to this outer frame via short linkage beams 63 on one side and 65 on the other, the beams 63 being symmetrical with the beams 65 with respect to the axis of symmetry 32. The beams 63, just like the beams 65, are distributed along one side of the frame 50, this side being parallel to the Ox axis. These short beams constitute practically rigid linkages through which the vibration energy along Ox and Oy of the intermediate frame 50 can pass into the coupling structure and therefore into the frames 50'. In the examples shown, two short beams 63 are distributed along one side of the external intermediate frame 50, while two other short beams 65 are distributed along the opposite side. There is no linkage beam between the intermediate frame and the outer coupling frame along the sides parallel to the Oy axis.

Figure 3A:
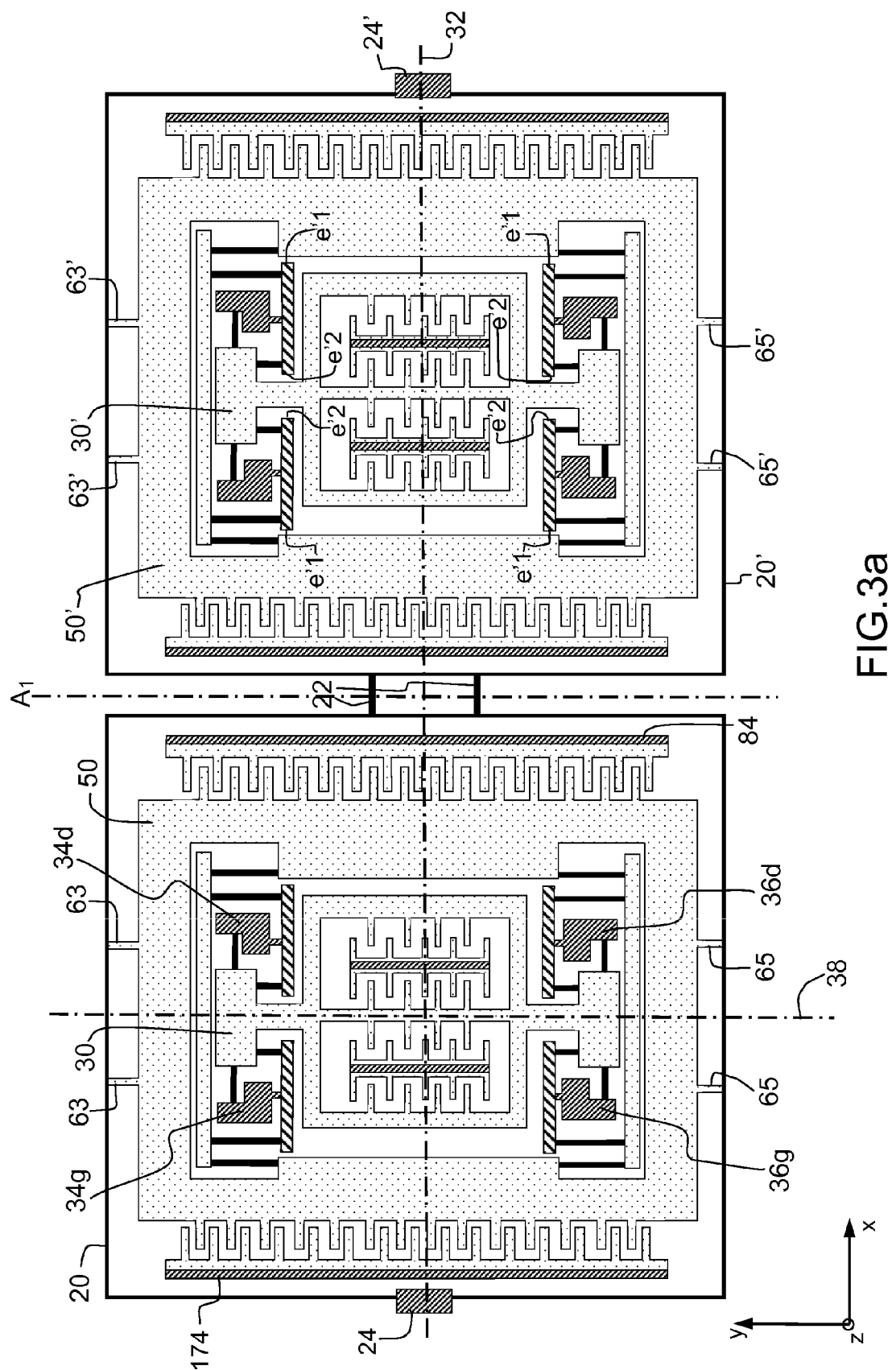
FIG. 3a shows schematically, in top view, the overall structure of the micromachined gyroscope according to a second embodiment of the invention
Figure 3B:
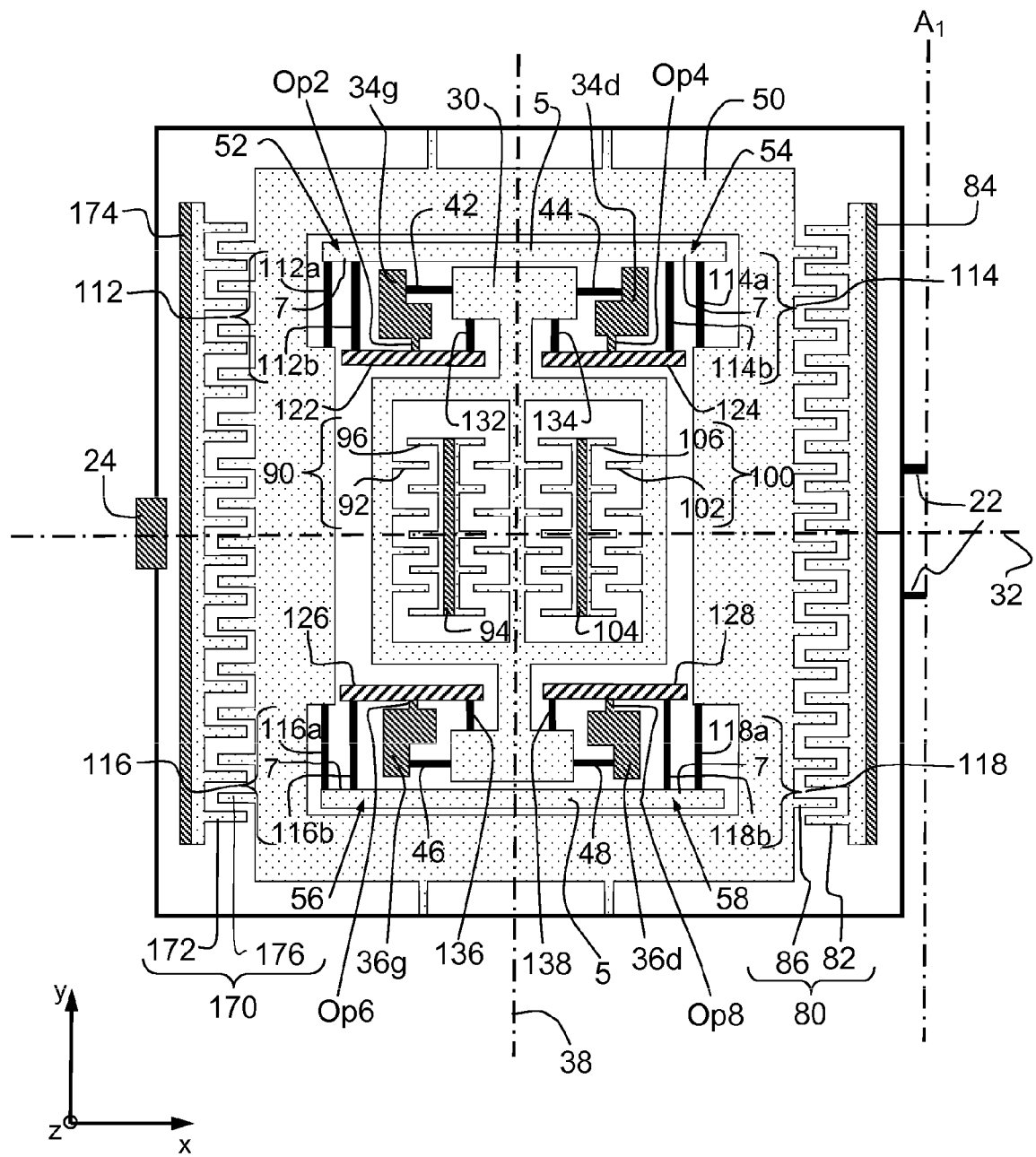
FIG. 3b shows an enlargement of the first moving assembly of the gyroscope according to the second embodiment.

In the two embodiments shown in FIGS. 1a and 1b and also in FIGS. 3a and 3b, the detection mass 30 is connected to fixed anchoring zones via linkage means, for linking the mass to the anchoring zones, comprising at least two flexure beams for linkage to the anchoring zones, designed to permit the detection mass 30 to move along Oy but prevent any significant movement of the mass in the Ox direction. These beams are preferably located on either side of an axis of symmetry 32 of the mass, parallel to Ox. In the first embodiment shown in FIG. 1b, there are two anchoring zones 34 and 36 located on either side of the detection mass, these being symmetrical with respect to the axis of symmetry 32. In addition, these zones are preferably located on another axis of symmetry 38 of the mass, which axis is parallel to Oy. The flexure beams for linkage to the anchoring zones, which connect the mass 30 to the anchoring zones, are beams elongated in the Ox direction so as to have a high stiffness (high resistance to elongation) in that direction. This high stiffness prevents the second moving element from moving along the Ox direction. They are also very narrow, compared to their length, so as to have a low stiffness in the Oy direction perpendicular to Ox. This low stiffness allows the mass to move along Oy. In the first embodiment of the invention, there are preferably four flexure beams for linkage to the anchoring zones rather than two, the mass being connected to the anchoring zone 34 via two beams 42 and 44 on either side of the zone 34. The mass is also connected to the second anchoring zone 36 via two beams 46 and 48 on either side of the zone 36.

To maximize the flexibility in the Oy direction of the flexure beams for linkage to the anchoring zones, by increasing the length/width ratio of these beams, each beam is connected on one side close to an end corner of the mass (the mass has in principle a generally rectangular shape, but it may also be cut around the anchoring zone in the Oy direction without significantly reducing the length of the mass in that direction) and on the other side to the anchoring zone located on the axis of symmetry 38.

In a variant, as shown in FIGS. 3a and 3b, the first anchoring zone comprises a right first anchoring zone 34d and a left first anchoring zone 34g. The second anchoring zone comprises a right second anchoring zone 36d and a left second anchoring zone 36g. The left and right anchoring zones are located on either side of the axis 38, which is parallel to Oy. Preferably, the respective first left anchoring zones 34g and 36g are symmetrical with respect to the respective first and second right anchoring zones 34d and 36d with respect to the other axis 38. There are therefore four flexure beams for linkage to the anchoring zones, the mass being connected to the respective first anchoring zones 34g, 34d via two respective first beams, namely a left beam 42 and a right beam 44 (shown in FIG. 3b), and connected to the respective second anchoring zones 36g, 36d via two respective second beams, namely the left beam 46 and the right beam 48, the left and right beams being on either side of the axis 32 parallel to Oy. In this variant, the mass 30 is cut away around the anchoring zones and has, between the two first anchoring zones and also between the two second anchoring zones, the shape of a T, the stem of which extends along the axis 38 and the bar which is parallel to the axis 32. For example, the mass has a shape which is symmetrical with respect to the axis 32 and to the axis 38.

The mass 30 is connected to the intermediate frame 50 via linkage means that allow transmission, in phase opposition, of the vibration movement of the first moving element along the Oy direction to the second moving element.

The linkage means comprise at least two linkage assemblies. Preferably, there are four linkage assemblies between the mass 30 and the intermediate frame 50, the linkage assemblies each being located in practice at a corner of the moving mass. They are arranged symmetrically, on the one hand, with respect to the axis of symmetry 32 of the mass (axis parallel to Ox) and, on the other hand, with respect to the axis of symmetry 38 (parallel to Oy). These assemblies are denoted in FIGS. 1b and 3b by the references 52, 54, 56, 58.

A linkage assembly comprises at least one linkage element extending between a first end and a second end and comprising a first narrow linkage (or flexure) beam elongate in the Oy direction and a means for transmitting, in phase opposition, a movement of the first moving element in the Oy direction to the second moving element.

The first linkage beams (bearing the numerical references 72a, 72b, 74a, 74b, 76a, 76b, 78a, 78b in FIGS. 1b and 112, 114, 116, 118 in FIG. 3b) have a high stiffness, that is to say a high resistance to elongation) in the Oy direction and a low stiffness in the Ox direction. They are capable of transmitting a movement of the first moving element along Oy to the second moving element. Because of their flexibility in the Ox direction, they prevent any deformation of the moving elements 50, 30 from the movement of the frame 50 along Ox and above all allow high-amplitude movement of 50 along Ox. The first beams are elongate in the Oy direction and have a small width (in the Ox direction) compared to their length, so as to provide this stiffness difference. The first flexure beams each extend between a first end and a second end.

The first flexure beams may either extend in their entirety in the direction in which they have the highest stiffness (the Oy direction), as may be seen in FIG. 1b, or may be beams that are bent into a U (as can be seen in FIG. 3b) each comprising two branches 112a, 112b; 114a, 114b; 116a, 116b; 118a, 118b that are connected together via one of their ends, by means of a short linkage element 7 for each beam. The free ends of the two branches constitute the first and second ends of the first beam. The beam extends between these two ends. In general, the bent shape of a beam makes it possible for its longitudinal dimensions to be reduced by a factor of two without significantly reducing its useful length, and therefore without significantly reducing the high ratio of its high stiffness to its low stiffness. Above all, the bent shape of the beams prevents there being any nonlinear deformations of the beams having an end that can move along Oy.

It is possible, as shown in FIGS. 1 and 2, to connect two linkage assemblies placed on either side of the axis 38 (or the axis 32) via a rigid element 5 so as to enhance the symmetry of the movement along the Oy direction of the first 50 and second 30 moving elements. In the embodiment shown in FIG. 2, the short linkage elements 7 form an integral part of a bar 5 extending between two linkage assemblies placed on either side of the axis 38.

Each linkage element furthermore includes a means (having the numerical references 62a, 62b, 64a, 64b, 66a, 66b, 68a, 68b in FIG. 1b and 122, 124, 126, 128 in FIG. 3b) for transmitting, in phase opposition, a movement of the first moving element 50 in the Oy direction to the second moving element 30. These means also extend between a first end and a second end. In a linkage element, the means for transmitting a movement in phase opposition is connected to the first beam. More particularly, the first ends of the first beam and of the means for transmitting a movement in phase opposition are connected to each other, their second ends forming the first and second ends respectively of the linkage element. The first beam is capable of transmitting a movement of the first moving element 50 along Oy to the means for transmitting a movement in phase opposition, which are capable of transmitting this movement along Oy, in phase opposition, to the second moving element 30.

In the rest of the text, the term "connected" is understood to mean that two adjacent elements are joined either directly or indirectly. A first element and a second element are said to be joined directly when the first element extends up to the second element, and vice versa. Two elements are said to be linked indirectly when they are separated by a third element. These elements are not separated by a third element. For example, a beam connected directly to the second moving element is obtained by a cut in the second moving element.

In the embodiment shown in FIG. 1b, each linkage assembly comprises two linkage elements. Moreover, the means for transmitting, in phase opposition, a movement of the first moving element 50 along the Oy direction to the second moving element 30 are elongate flexure beams, referred to as second flexure beams 62a, 62b, 64a, 64b, 66a, 66b, 68a, 68b, having a high resistance to elongation in the Ox direction and a low stiffness in the Oy direction. These beams, like the first beams, have a spring function.

Since the second beams and the first beams lie in two perpendicular directions, they form L shaped linkage elements 62a with 72a, 64a with 74a, and so on. An L shaped linkage element comprises two branches, one of which is formed by the first beam and the other of which is formed by the second beam. Moreover, the first and second flexure beams all extend over their entirety in a direction in which they have a high resistance to elongation (the Oy direction for the first beams and the Ox direction for the second beams). The linkage assemblies are connected on one side to the first moving element and on the other side to the second moving element. They each comprise two L shaped linkage elements connected together via a short linkage element 2, 4, 6, 8. For example, the first linkage assembly comprises two linkage elements 62a, 72a and 62b, 72b connected together via a short linkage element 2. Thus, a double L is obtained, formed from two parallel Ls, namely an outer L (close to the first moving element, for example the element 62a, 72a) and an inner L (close to the second moving element, 62b, 72b). More precisely, the first ends of the adjacent linkage elements are connected via a short linkage element extending in the direction perpendicular to the highest stiffness direction of the beams forming said first ends, and the second ends are connected to the first and second moving elements respectively. For example, in FIG. 1b the second beams of two Ls forming a linkage assembly are connected together via their free ends by a short linkage element 2, 4, 6, 8 extending in the direction Oy and the first beam of the outer L and the second beam of the inner L are respectively connected to the first moving element and to the second moving element respectively. Preferably, the linkage elements are connected directly to the moving elements.

By forming a double L, the first and second beams of a linkage assembly are, as it were, doubled. This makes it possible to absorb the deformations of the beams in the direction perpendicular to the direction along which they extend. The movement of the second element with respect to that of the first moving element is thus precisely controlled.

Since the inner L is smaller than the outer L, the two bars (i.e. the first and second beams) of the inner L are advantageously connected directly to each other. The two bars (i.e. the first and second beams) of the outer L are preferably connected via a rigid element 3. The rigid element 3 has a length Lx along the Ox direction and a length Ly along the Oy direction, this being equal to the difference in length along the Ox direction and the Oy direction between the inner L and the outer L respectively.

The rigid rigid is said to be bulky when it has a width lx along the Ox direction and a width ly along the Oy direction that are larger than the width of the first beam in the Ox direction and that of the second beam in the Oy direction, respectively. In this way, the element 3 is rigid along Ox and Oy. In this case, the element is said to be bulky. Thus the design of the gyroscope is facilitated, so as to separate, from one another, the frequencies of the various vibration modes (that is to say to separate the useful modes from the unuseful modes), as all the beams of the linkage assemblies have the same length. In the embodiment shown in FIG. 1a, the respective lengths Lx and Ly are equal to the respective widths lx and ly.

In the embodiment shown in FIG. 1a, the rigid element is a square element. Preferably, the size of the rigid element is as small as possible so as to lose as little space as possible. As a variant, the two bars of the outer L are connected directly to each other. The outer bars of the L then have greater lengths than those of the inner L.

Figure 2A:
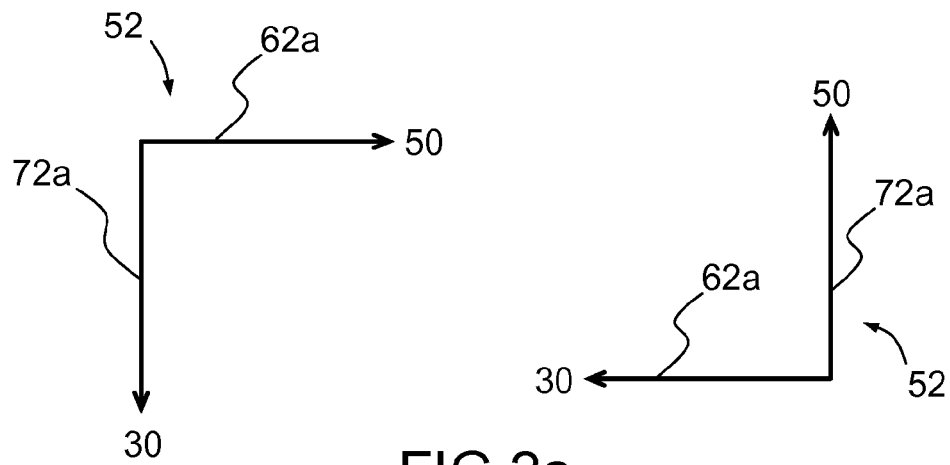
FIGS. 2a, 2b and 2c show schematically examples of linkage elements according to the invention.
Figure 2B:
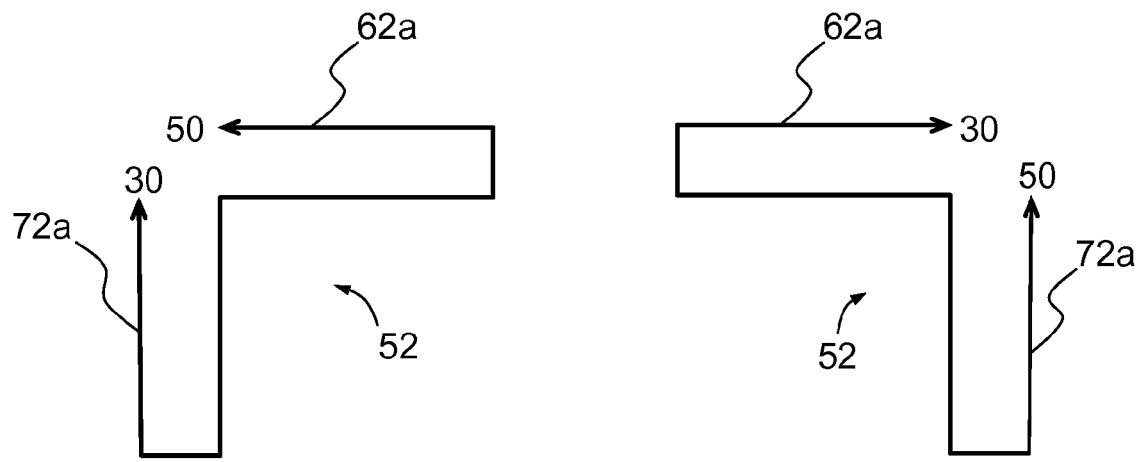
Figure 2C:
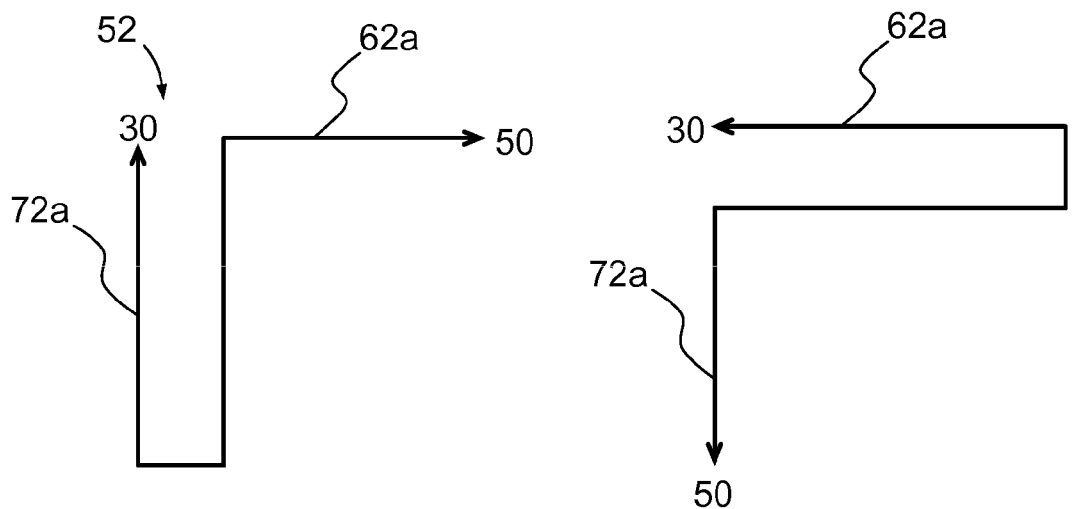

As a variant, a linkage assembly comprises only one L shaped linkage element connected on one side (via a first end) to the first moving element and on the other side (via the second end) to the second moving element. FIGS. 2a, 2b and 2c show schematically these variants of the linkage element 52, in which the numerical references denoting the moving elements to which it is connected are indicated at the end of the arrows representing the first and second beams. The first and second beams may both extend in their entirety along the direction in which they have a high resistance to elongation (FIG. 2a). As a variant, one of the two beams (FIG. 2c) or both beams (FIG. 2b) may be beams bent into a U (one branch of the U being connected to the adjacent beam and the other branch of the U is connected to one of the moving elements 30, 50). If both beams are bent, there is again a double L configuration different from the double L configuration described above in the sense that the first moving element is connected to the linkage element via the first beam (or second beam), whereas the second moving element is connected to the linkage element via the other type of beam, namely the second beam (or the first beam). This configuration gives other possible ways of arrangement in the shape of the moving elements 50 and 30. Preferably, the L is connected directly to the two moving elements, the beams forming the L then being obtained by respective cuts in the two moving elements. In these embodiments, the shapes of the two moving elements are adapted so as to establish the linkages that may be seen in FIGS. 2a, 2b and 2c.

The gyroscope according to the first embodiment has six in-plane vibration modes, among which are the useful tuning-fork excitation and detection modes, the other four modes being parasitic modes. In the useful excitation mode, only the first moving elements vibrate along the Ox axis, the second moving elements being stationary. In the detection mode, the movement of the first moving elements along the Oy axis causes the second elements to move in phase opposition therewith. The linkage means characterized by stiffness coefficients make it possible to separate the useful modes from the other, parasitic modes. The gyroscope is preferably designed in such a way that the following condition is met:

$$K_{42,44,46,48}/M_{30} = 2K_{20}/M_{50}$$

$K_{42,44,46,48}$ being the stiffness coefficient of the flexure beams 42, 44, 46, 48 connecting the mass 30 to the anchoring zones, $K_{20}$ being the stiffness coefficient of the outer frame 20 along Oy and $M_{50}$ and $M_{30}$ being the respective masses of the first 50 and second 30 moving elements.

When this condition is met, the tuning-fork mode is dynamically balanced, that is to say the resultant of the forces transmitted to the support is zero and the amplitude $Y_{30}$ of the detection movement of the second moving element 30 along Oy is such that:

$$Y_{30}/Y_{50} = M_{50}/M_{30},$$

$Y_{50}$ being the amplitude of the movement of the first moving element 50 along Oy.

By choosing $M_{30} < M_{50}$, the amplitude of the detection movement $Y_{30}$ along Oy is therefore greater than that of the first moving element 50. In this way, it is therefore possible to increase the sensitivity of the gyroscope in the ratio $M_{50}/M_{30}$.

FIGS. 3a and 3b show a second embodiment of the gyroscope according to the invention. The elements common to the first and second embodiments have the same numerical references. The differences between the first and second embodiments will now be described. The means for transmitting a movement in the Oy direction, in phase opposition, of the first moving element 50 to the second moving element 30 of each linkage element is a lever 122, 124, 126, 128 connected on one side to a first beam 112, 114, 116, 118 and on the other side to a moving element 30 or 50. The linkage assemblies each comprise a single linkage element which is connected on one side to the first moving element and on the other side to the second moving element. In the example shown in FIG. 3b, the lever is connected on one side to the second moving element 30 via a beam 132, 134, 136, 138 having a high stiffness in the Oy direction and on the other side directly to the first beam 112, 114, 116, 118, and the first beam is connected directly to the first moving element 50. As a variant, the lever is connected directly to a moving element and to the first beam. Each lever is linked with an anchoring zone 34g, 34d, 36, 36d so as to pivot about respective pivot axes Op2, Op4, Op6, Op8 that extend along the Oz direction and located respectively between the first beam 112, 114, 116, 118 and the moving element (here 30) to which the lever is connected. In other words, each axis Op is located between the two ends e1, e2 of a lever. The pivot axes Op2, Op4, Op6, Op8 are fixed relative to the anchoring zones. For greater clarity, only the ends of the lever on the second moving assembly have been referenced in FIG. 3a. They are also referenced in FIG. 4, which will be described later.

When the first moving element 50 moves downward in the Oy direction, the first beam 112, 114, 116, 118 pulls the first end e1 of the corresponding lever in the Oy direction, thereby causing the corresponding lever to pivot about the corresponding pivot axis, namely Op2, Op4, Op6, Op8 respectively. The second end e2 of the levers are therefore directed upward in the Oy direction, entraining with them the first moving element 30. The movement of the first moving element 50 along Oy is thus transmitted in the opposite direction to the second moving element 30.

Preferably, when the first 50 and second 30 elements oscillate relative to each other in the Oy direction, each lever pivots about a rest position in which it lies in the rest position thereof. The rest position of the lever is the position in which it lies when the two moving elements occupy their respective rest positions in the Oy direction. Each lever preferably lies substantially along the Ox direction when it is in its rest position. The rest position of an element that can move along the Oy direction refers to the position about which said element oscillates in the Oy direction. In this way, a lever linked so as to pivot about an axis parallel to the Oz direction has a very high stiffness in the Ox direction compared with the Oy direction.

Preferably, the levers are rigid in the direction in which they extend. In this way, the rigidity in the Ox direction is improved. In this embodiment, the rigid levers linked to the anchoring zones so as to pivot about an axis parallel to the Oz direction and connected to the mass 30 provide the linkage means for linking the mass 30 to the anchoring zones. This is because the pivot linkage prevents a translational movement of the first moving element 50 from being transmitted to the second moving element 30 in the Ox direction, since the pivot linkage prevents the mass 30 from moving in the Ox direction.

In this embodiment, the linkage means for linking the mass 30 to the anchoring zones are common with the linkage means for linking the mass 30 to the first element 50.

In this embodiment, the assemblies have for example no flexure beams for linkage to the anchoring mediums 42, 44, 46, 48.

Figure 4:
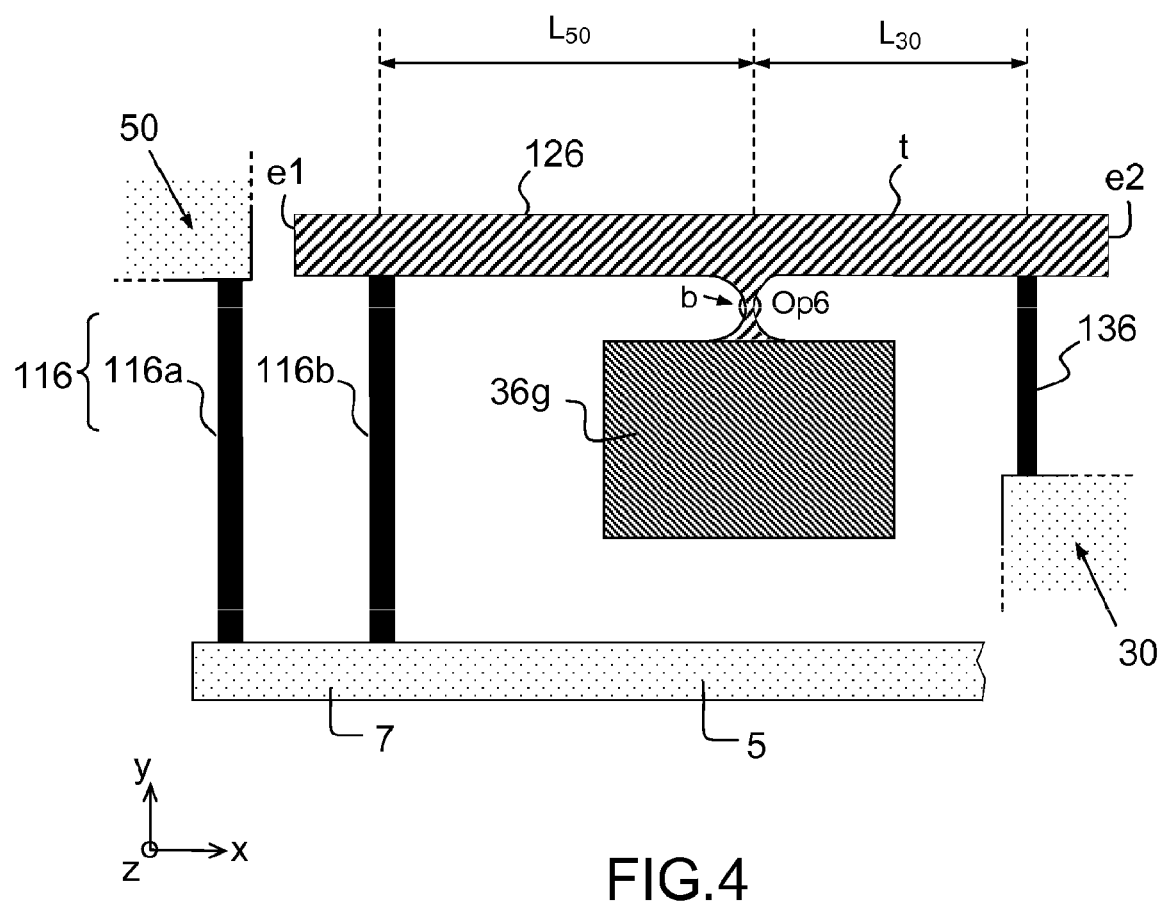
FIG. 4 shows schematically an enlargement of FIG. 3b.

FIG. 4 shows an enlargement of the linkage between an anchoring zone 36g and a lever 126, which is similar to the linkage between each lever and an anchoring zone. The lever is attached rigidly (as regards translational movement) but flexibly (as regards rotational movement about the axis Op6) to an anchoring zone. The lever comprises a rigid rod t extending between the first and second ends of the lever and a branch b extending, in the direction perpendicular to the rigid rod, between the rigid rod and the anchoring zone. This branch b has two end zones (at the points where the rigid rod joins the anchoring zone) which are wide in the direction of the rod and a weakened central zone (that is to say one which is thin in the direction of the rod). In this way, the center of the branch connecting the rigid rod to the anchoring zone constitutes a pivot of axis Op6 about which the rod t can pivot.

The gyroscope according to the invention has only four in-plane vibration modes among which are the useful excitation and detection modes in phase opposition, the other two modes being in-phase modes of the elements 50 and 50' along the X and Y axes. This is because the use of a lever means that the movement of a first moving element along the Oy direction is always in phase opposition with that of the second moving element. Consequently, the gyroscope according to the invention is easier to design than that of the first embodiment. The linkage means characterized by stiffness coefficients enable the useful modes to be separated from the parasitic modes.

Depending on the first distance $L_{50}$ between the axis Op2, Op4, Op6, Op8 of a pivot and the respective points of linkage of a lever 122, 124, 126, 128 to the first moving element 50 (here the distance between the axis of the pivot and the first linkage beam linking the lever to the first moving element) and depending on the second distance $L_{30}$ between the respective pivot axes Op2, Op4, Op6, Op8 and the points of linkage of the respective levers 122, 124, 126, 128 to the first moving element (here between the axis of the pivots 122, 124, 126, 128 and the respective rigid beams 132, 134, 136, 138 linking the lever to the second moving element 30) along the axis of the rod (called the axis of the lever), it is possible to vary the amplitude of the movement of the second moving element 30 relative to the amplitude of the movement of the first moving element 50. In order for the detection mode to be balanced, that is to say for the resultant of the forces transmitted to the support to be zero, the following condition must be met:

$$L_{30}/L_{50}=M_{50}/M_{30},$$

$L_{30}$ being the distance between the pivots and the second moving element along the axis of the lever, $L_{50}$ being the distance between the pivots and the first moving element along the axis of the lever and $M_{50}$ and $M_{30}$ being the respective masses of the moving elements 50 and 30.

By choosing $M_{30}<M_{50}$, the amplitude along Oy of the detection movement of the second moving element is therefore greater than that of the first moving element 30. In this way, the sensitivity of the gyroscope may therefore be increased in the ratio $M_{50}/M_{30}$.

As indicated in FIGS. 1b and 3b, the external intermediate frame 50 is excited into vibration along Ox by a first interdigitated comb structure 170 which comprises a stationary half-comb 172 attached to an anchoring zone 174 and a moving half-comb 176 formed along a first side (parallel to Oy) of the frame 50. The teeth or fingers of the fixed half-comb 172, made of conducting silicon machined at the same time as the other elements of the gyroscope, constitute the first plate of a capacitor and the teeth or fingers of the moving half-comb 176, also made of conducting silicon, constitute the second plate of this capacitor. Conventionally, the comb structure acts as an exciter, to excite the movement of the moving part by virtue of the attractive forces that are exerted between the facing fingers when a voltage is applied between the half-combs. The excitation voltage is an AC voltage so as to generate a vibrational movement and the frequency of this voltage is chosen to be very close or equal to the mechanical resonant frequency of the structure. The excitation voltage is applied between the anchoring zone 174 and one and/or other of the anchoring zones 34 and 36 (or 34g, 34d, 36g, 36d). The stationary half-comb 172 is in direct electrical contact (by the body of the conducting silicon) with the anchoring zone 174 and the moving half-comb 176 is in contact with the anchoring zones 34 and 36 (or 34g, 34d and 36g, 36d) via the linkage means and the bodies of the frames 30 and 50, so that, on applying a voltage between the anchoring zone 174 and the anchoring zones 34 or 36 (or 34g, 34d and 36g, 36d), a voltage is properly applied between the stationary part and the moving part of the comb 170.

The excitation movement generated on the external intermediate frame 50 is along the Ox direction, the combs acting by modifying the area of the mutual overlap of the interlaced fingers. The microgyroscope preferably has another interdigitated comb structure 80 associated with the frame, this being symmetrical with the structure 170 with respect to the axis 38. It comprises a stationary half-comb 82, attached to an anchoring zone 84, and a moving half-comb 86 machined along one side of the frame 50. This structure may serve for detecting the movement of the frame along Ox. It is useful for controlling the movement excited by the comb 170—the control is in general useful for adjusting the excitation frequency relative to the resonant frequency of the structure and the excitation amplitude. The voltages detected by the structure 80 appear between the anchoring zone 84 and the anchoring zones 34 and 36 (or 34g, 34d and 36g, 36d).

At least one interdigitated comb is associated with the detection frame 30 in order to detect the movement of the detection frame in the Oy direction. The orientation of these combs depends on the principle on which the detection is based: if the detection is based on a measurement of the variations in area of mutual overlap of the fingers of the stationary and moving half-combs, the comb for detecting the movements along Oy is placed so as to be perpendicular to the excitation comb 170 (which also is based on variations in the overlap area). However, if the detection is based on a measurement of the variations in spacing between the fingers of the fixed half-comb and the moving half-comb, the detection comb is placed parallel to the excitation comb. Detection by varying the spacing between fingers is preferred as it is more sensitive. The interdigitation of the combs is then asymmetrical at rest, the fingers of one half-comb not being exactly at the middle of the gap between two fingers of the other half-comb, whereas a comb operating (like the excitation comb) on the basis of variations in the area of overlap has the fingers of one half-comb at the middle of the gap between the fingers of the other half-comb. This is the case shown in FIGS. 1a and 1b: the detection combs are placed in the same general orientation as the combs 170 and 80, although said detection combs are associated with a movement along Oy, whereas the combs 170 and 80 are associated with a movement (for excitation or detection) along Ox. In the example shown in FIGS. 1a and 1b, the detection frame is associated with two identical interdigitated combs 90 and 100 placed along the axis of symmetry 38. These combs both play the same role of detecting the movement of the mass along Oy, and as a variant it could be possible to have just a single comb placed at the center of the frame or to have two combs placed on either side of the axis of symmetry 38 as shown in FIG. 3b.

The comb 90 comprises a stationary half-comb 92 attached to an anchoring zone 94 and a moving half-comb 96 forming part of the detection mass itself. The detection mass includes a cut for leaving space for the stationary comb 92 and for the anchoring zone 94, and the edges of this cut are cut in the form of fingers so as to constitute the moving half-comb 96 in which the fingers of the stationary half-comb are interleaved. In the example shown, the comb 90 is a double comb, that is to say two sides of the cut of the mass 30 are provided with fingers, and the stationary half-comb 92 has fingers on either side of the anchoring zone 94.

In FIG. 3b, the interdigitated structure 100 is strictly symmetrical to the structure 90 with respect to the axis 32 and is formed by another cut in the detection mass 30. It comprises a stationary half-comb 102, an anchoring zone 104 and a moving half-comb 106. In the variant shown in FIG. 3b, the interdigitated structure 100 is strictly symmetrical with the structure 90 with respect to the axis 38. For detecting the movement along Oy, an electronic circuit associated with this structure detects the amplitude modulation of the electrical voltages present between the anchoring zone 94 and the anchoring zones 34 and 36 and/or between the zone 104 and the zones 34 and 36 (or 34g, 34d and 36g, 36d). This modulation is due only to a movement of the detection mass along the Oy axis since the mass can move only along this axis.

The beams of the levers are freed (any oxide is removed) as are also the linkage elements 116 and 136. The part 36 is a part that remains anchored (the entire oxide is unetched).

The invention claimed is:

1. A gyroscope having a vibrating structure, produced by micromachining in a thin planar wafer, said gyroscope comprising:
two symmetrical moving assemblies coupled by a coupling structure connecting the two moving assemblies so as to allow mechanical vibration energy to be transferred between said two moving assemblies, each moving assembly comprising
a first moving element connected to the coupling structure and able to vibrate with two degrees of freedom in orthogonal Ox and Oy directions of the plane of the wafer, and
a second moving element intended to vibrate only along the Oy direction and connected to fixed anchoring zones via linkage means for linking the second moving element to the anchoring zones that do not allow the second moving element to move in the Ox direction, said second moving element being adjacent the first moving element and connected to the first moving element via linkage means;
wherein the linkage means allow the transmission, in phase opposition, to the second moving element of the vibration movement of the first moving element in the Oy direction,
wherein the linkage means comprise at least two linkage assemblies for linking the first moving element with the second moving element, the linkage assemblies comprising at least one linkage element comprising a first narrow elongate flexure beam which has a high resistance to elongation in the Oy direction and a low stiffness in the Ox direction connected to a transmitting means for transmitting, in phase opposition, a movement of the first moving element in the Oy direction to the second moving element, and
wherein the transmitting means for transmitting, in phase opposition, a movement of the first moving element in the Oy direction to the second moving element is a second narrow elongate flexure beam which has a high resistance to elongation in the Ox direction and a low stiffness in the Oy direction, the second beam being connected to the first beam so as to form an L-shaped linkage element.

2. The gyroscope according to claim 1, wherein the first moving element is a frame connected to the coupling structure and surrounding the second moving element; and the coupling structure comprises an external frame at least partially surrounding the first moving element.

3. The gyroscope according to claim 1, wherein the first flexible beam of an L-shaped linkage element extends entirely in a first direction in which said first flexible beam has a high resistance to elongation and the second flexible beam of an L-shaped linkage element extends entirely in a second direction in which said second flexible beam has a high resistance to elongation.

4. The gyroscope according to claim 1, wherein at least the first or second flexible beam of an L-shaped linkage element is a beam bent over into a U comprising two branches connected by a short linkage element.

5. The gyroscope according to claim 1, wherein the linkage assemblies comprise only one L-shaped linkage element connected on one side to the first moving element and on the other side to the second moving element.

6. The gyroscope according to claim 3, wherein the linkage assemblies comprise two linkage elements connected together via a short linkage element and connected to the first moving element and to the second moving element respectively.

7. The gyroscope according to claim 6, wherein
the linkage assemblies forming double Ls comprise an outer L and an inner L,
a length along the Ox direction and a length along the Oy direction of the outer L are greater than a length along the Ox direction and greater than a length along the Oy direction respectively of the inner L,
a first beam and a second beam forming the outer L are connected together via a rigid element, a length along the Ox direction of the rigid element and a length along the Oy direction of the rigid element are equal to the difference in length along the Ox direction and along the Oy direction between the outer L and the inner L respectively.

8. The gyroscope according to claim 1, wherein first and second beams forming each L of a linkage assembly are directly connected one to the other.

9. The gyroscope according to claim 1, wherein each moving assembly comprises at least two narrow elongate flexure beams for linkage to the anchoring zones connecting the second moving element to at least one anchoring zone, the flexure beams for linkage to the anchoring zones having a high resistance to elongation in the Ox direction and a low stiffness in the Oy direction.

10. The gyroscope according to claim 9, wherein the following condition is met or approximately met:

$$K_{42,44,46,48}/M_{30} = 2K_{20}/M_{50},$$

wherein $K_{42,44,46,48}$ is a stiffness coefficient of the second flexure beams; $K_{20}$ is a stiffness coefficient along the Oy axis of the outer frame, and $M_{50}$ and $M_{30}$ are the respective masses of the first and second moving elements.

11. A gyroscope having a vibrating structure, produced by micromachining in a thin planar wafer, said gyroscope comprising:
two symmetrical moving assemblies coupled by a coupling structure connecting the two moving assemblies so as to allow mechanical vibration energy to be transferred between said two moving assemblies, each moving assembly comprising
a first moving element connected to the coupling structure and able to vibrate with two degrees of freedom in orthogonal Ox and Oy directions of the plane of the wafer, and a second moving element intended to vibrate only along the Oy direction and connected to fixed anchoring zones via linkage means for linking the second moving element to the anchoring zones that do not allow the second moving element to move in the Ox direction, said second moving element being adjacent the first moving element and connected to the first moving element via linkage means;

wherein the linkage means allow the transmission, in phase opposition, to the second moving element of the vibration movement of the first moving element in the Oy direction, wherein the linkage means comprise at least two linkage assemblies for linking the first moving element with the second moving element, the linkage assemblies comprising at least one linkage element comprising a narrow elongate flexure beam which has a high resistance to elongation in the Oy direction and a low stiffness in the Ox direction connected to a transmitting means for transmitting, in phase opposition, a movement of the first moving element in the Oy direction to the second moving element, wherein the linkage assemblies comprise a single linkage element connected on one side to the first moving element and on the other side to the second moving element, wherein the transmitting means for transmitting, in phase opposition, a movement of the first moving element in the Oy direction to the second moving element, is a lever connected on one side to the beam and on the other side to one of the two moving elements, the beam is further connected to the moving element adjacent that to which the lever is connected, and wherein the lever being linked with an anchoring zone so as to pivot about a pivot axis extending along an Oz direction perpendicular to the plane of the wafer lying between the first beam and the moving element to which the lever is connected.

12. The gyroscope according to claim 11, wherein the first flexible beam extends entirely along the Oy direction.

13. The gyroscope according to claim 12, wherein the first flexible beam is a beam bent into a U comprising two branches connected together via a short rigid element.

14. The gyroscope according to claim 11, wherein the lever extends substantially along the Ox direction when the first moving element and the second moving element are in respective rest positions around which said moving element oscillate respectively.

15. The gyroscope according to claim 11, wherein the following condition is met or approximately met:

$$L_{30}/L_{50}=M_{50}/M_{30},$$

wherein $L_{50}$ is a first distance between the pivot axis and a point of linkage of a lever to the first moving element along the axis of the lever, $L_{30}$ is a second distance between the pivot axis and a point of linkage of the lever to the second moving element along the axis of the lever, and $M_{50}$ and $M_{30}$ are respective masses of the first moving element and the second moving element.

16. The gyroscope according to claim 11, wherein $M_{50}$ and $M_{30}$ are respective masses of the first moving element and the second moving element, and wherein $M_{30}$ is less than $M_{50}$ so as to increase the sensitivity of the gyroscope.

17. The gyroscope according to claim 1, wherein each moving assembly comprises at least two narrow elongate flexure beams for linkage to the anchoring zones, connecting the second moving element to at least one anchoring zone, the flexure beams for linkage to the anchoring zones having a high resistance to elongation in the Ox direction and a low stiffness in the Oy direction.

18. The gyroscope according to claim 1, wherein the linkage means for linking the second moving element to the anchoring zones comprise at least two flexure beams for linkage to the anchoring zones, which allow the second moving element to move along the Oy direction but prevent any significant movement of the mass along the Ox direction.

19. The gyroscope according to claim 11, wherein
the first moving element is a frame connected to the coupling structure and surrounding the second moving element; and
the coupling structure comprises an external frame at least partially surrounding the first moving element.

20. The gyroscope according to claim 11, wherein each moving assembly comprises at least two narrow elongate flexure beams for linkage to the anchoring zones, connecting the second moving element to at least one anchoring zone, the flexure beams for linkage to the anchoring zones having a high resistance to elongation in the Ox direction and a low stiffness in the Oy direction.

21. The gyroscope according to claim 11, wherein the linkage means for li nking the second moving element to the anchoring zones comprise at least two flexure beams for linkage to the anchoring zones, which allow the second moving element to move along the Oy direction but prevent any significant movement of the mass along the Ox direction.

* * * * *